United States Patent
Meyran

(10) Patent No.: US 11,156,242 B2
(45) Date of Patent: Oct. 26, 2021

(54) MAGNETIC ATTACHMENT DEVICE

(71) Applicant: Bryan Meyran, West Palm Beach, FL (US)

(72) Inventor: Bryan Meyran, West Palm Beach, FL (US)

(*) Notice: Subject to any disclaimer, the term of this patent is extended or adjusted under 35 U.S.C. 154(b) by 0 days.

(21) Appl. No.: 16/929,606

(22) Filed: Jul. 15, 2020

(65) Prior Publication Data
US 2021/0018024 A1    Jan. 21, 2021

Related U.S. Application Data

(60) Provisional application No. 62/874,575, filed on Jul. 16, 2019.

(51) Int. Cl.
| | |
|---|---|
| F16B 2/06 | (2006.01) |
| F16M 13/02 | (2006.01) |
| A45F 5/02 | (2006.01) |
| H01F 7/02 | (2006.01) |

(52) U.S. Cl.
CPC ............... *F16B 2/06* (2013.01); *A45F 5/021* (2013.01); *A45F 5/022* (2013.01); *F16M 13/022* (2013.01); *H01F 7/02* (2013.01)

(58) Field of Classification Search
CPC combination set(s) only.
See application file for complete search history.

(56) References Cited

U.S. PATENT DOCUMENTS

| | | | | |
|---|---|---|---|---|
| 888,896 | A * | 5/1908 | Howard | A46B 17/02 248/685 |
| 3,231,919 | A * | 2/1966 | MacDonald | A46B 17/02 15/174 |
| 3,612,464 | A * | 10/1971 | Harrah | A46B 17/00 248/685 |
| 8,479,685 | B2 * | 7/2013 | Sprung | H01F 7/0252 119/51.04 |
| 2005/0023420 | A1 * | 2/2005 | Sadeh | B42F 11/04 248/206.5 |
| 2005/0156085 | A1 * | 7/2005 | Radovan | B44D 3/123 248/110 |
| 2006/0163295 | A1 * | 7/2006 | Badillo | A45F 5/021 224/269 |
| 2015/0216276 | A1 * | 8/2015 | Stratton | A45F 5/02 224/183 |
| 2016/0134733 | A1 * | 5/2016 | Murphy | H04B 1/3888 455/575.6 |
| 2017/0135460 | A1 * | 5/2017 | Seuk | A45F 5/021 |
| 2017/0311709 | A1 * | 11/2017 | McInerney | A46B 17/02 |

* cited by examiner

*Primary Examiner* — Monica E Millner
(74) *Attorney, Agent, or Firm* — Antonio Papageorgiou; Lombard Geliebter LLP

(57) ABSTRACT

A clamping device is provided that includes a first magnetic disc and a second magnetic disc, each of the discs located on a first sheet of flexible material a distance apart vertically and covered by at least a second sheet of flexible material, the first sheet of flexible material forming a hinge between the first and the second magnetic discs, and an outer surface of the clamping device. The second sheet of flexible material forms an inner surface of the clamping device and the inner surface of the clamping device has a textured surface thereon.

11 Claims, 3 Drawing Sheets

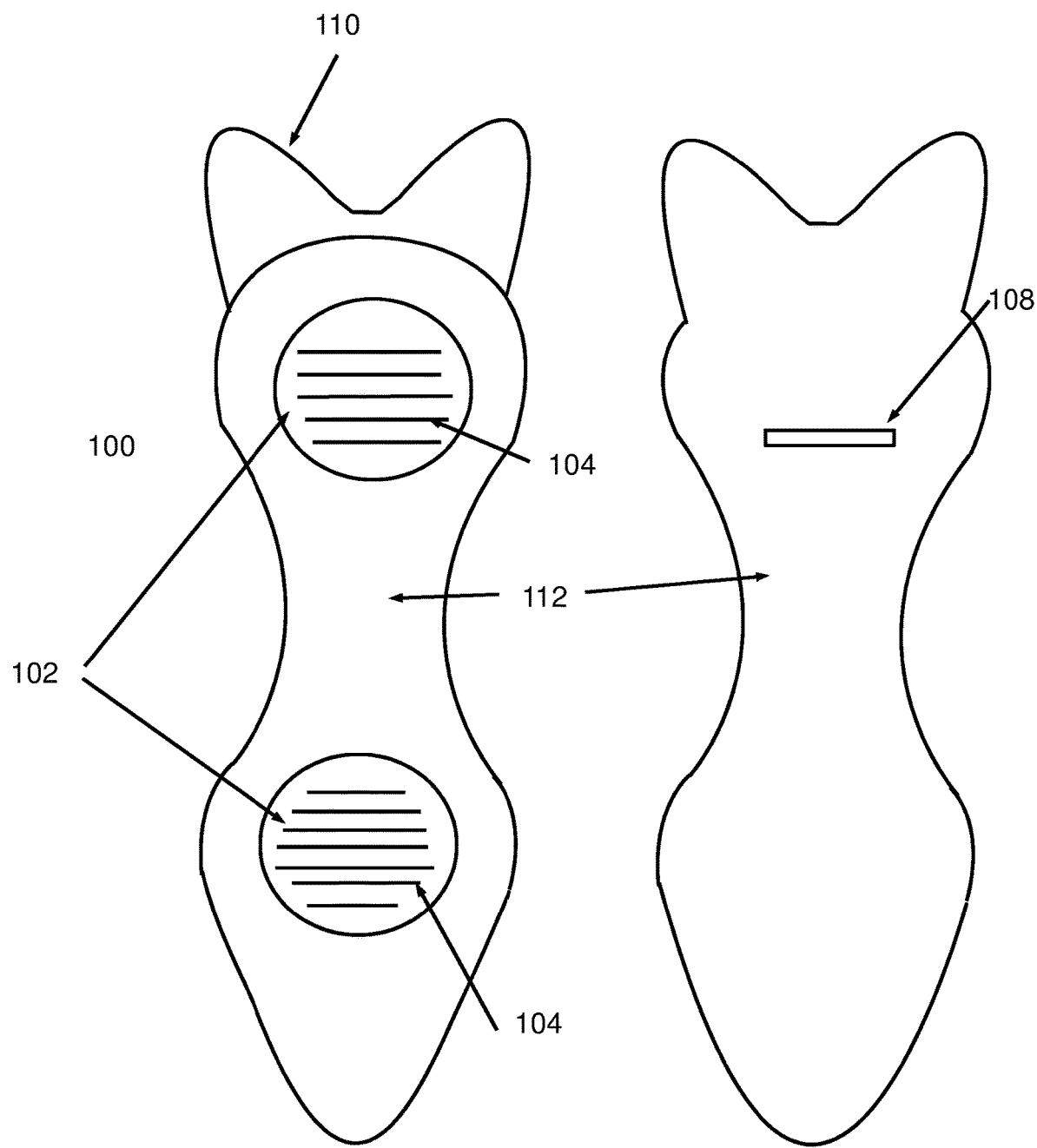

MAGNETIC ATTACHMENT DEVICE

BACKGROUND OF THE INVENTION

The present application relates to devices that clamp objects using magnets.

Several devices exist that use magnets to clamp object therebetween, such as U.S. Pat. Nos. 4,255,837 and 3,529,328, each of which is incorporated herein by reference. Magnetic clip and magnetic clothes pins, however, consist of magnets that are not strong enough to hold items of any significant weight. Accordingly, there is a need for devices that are not so limited.

SUMMARY OF THE INVENTION

The present application generally provides an attachment device with magnets having strength and optionally additional structure to hold items having substantial weight, e.g., greater than one or more pounds. The devices further include a PVC or other suitable material coating that surrounds the magnets, allowing them to be placed on any surfaces, such as vehicles, refrigerator etc., without any damage thereto. The two magnets are preferably glued or fused in between two PVC sheets of material allowing enough protection to the surface that it is applied to. The device may also include of a more textured material used on the inside or side of the device that meets the material that is being held, for better resistance against the weight of the object.

The magnets are preferably durable, e.g., coated with three layers of nickel, copper, and nickel to reduce corrosion and provide a smooth finish which greatly increase the longevity of the Magnets. Each of the magnets can preferably support 12 kg (+/−20%) pull vertically (a direction parallel with the face of the magnet) when in flush contact with a mild steel surface. The magnets are preferably 32 mm diameter×5 mm thick, optionally with a 5 mm diameter countersunk hole for fixing. Tolerances are +/−0.1 mm, although larger or smaller magnets may be used depending on the desired strength.

The total length of the device is preferably approximately 2"×4", consisting of two sheets of 40 mil. flexible PVC material glued together with a high strength glue. Each magnet is glued and placed in-between the two sheets of PVC material, preferably one smooth and one textured, as shown in the accompanying figures.

The magnetic attaching device is especially suitable for magnetically retaining large cloth materials or items, or articles of considerable weight when in contact with any mild steel surface. The device preferably includes two permanent magnet elements between which the article is retained, which are coupled with each other by a joint or hinge.

In one aspect, a clamping device is provided that includes a first magnetic disc and a second magnetic disc, each of the discs located on a first sheet of flexible material a distance apart and covered by at least a second sheet of flexible material, the first sheet of flexible material forming a hinge between the first and the second magnetic discs, and an outer surface of the clamping device, the at least a second sheet of flexible material forming an inner surface of the clamping device, the inner surface of the clamping device having a textured surface thereon.

In at least one embodiment, the inner surface of the clamping device has a textured surface over each of the magnetic discs.

In at least one embodiment, the textured surface comprises a plurality of lateral groves.

In at least one embodiment, the lateral groves are parallel with each other.

In at least one embodiment, the outer surface comprises a protrusion extending outward from the outer surface.

In at least one embodiment, the protrusion comprises a lateral structure.

In at least one embodiment, the protrusion is retractable into the outer surface.

In at least one embodiment, the discs have a circular shape.

In at least one embodiment, the hinge is formed by a singular sheet of material between opposing ends of the device each comprising at least two layers of material.

In at least one embodiment, the device includes at least one tab at each of the opposing ends of the device.

In at least one embodiment, the opposing ends and the hinge form an hourglass shape.

In at least one embodiment, the device is configured to support at least 20 kg force in a direction parallel to the inner surface of the device when in contact with a mild steel surface.

In at least one embodiment, the discs have a circular shape and a diameter of at least 32 mm.

In at least one embodiment, the device has a vertical dimension of about 4 inches and a lateral dimension of about 2 inches.

BRIEF DESCRIPTION OF THE FIGURES

FIG. 1 is a diagram showing an inner face of an attachment device according to at least one embodiment herein.

FIG. 2 is a diagram showing an outer face of an attachment device according to at least one embodiment herein.

DETAILED DESCRIPTION OF THE INVENTION

Figure 3:
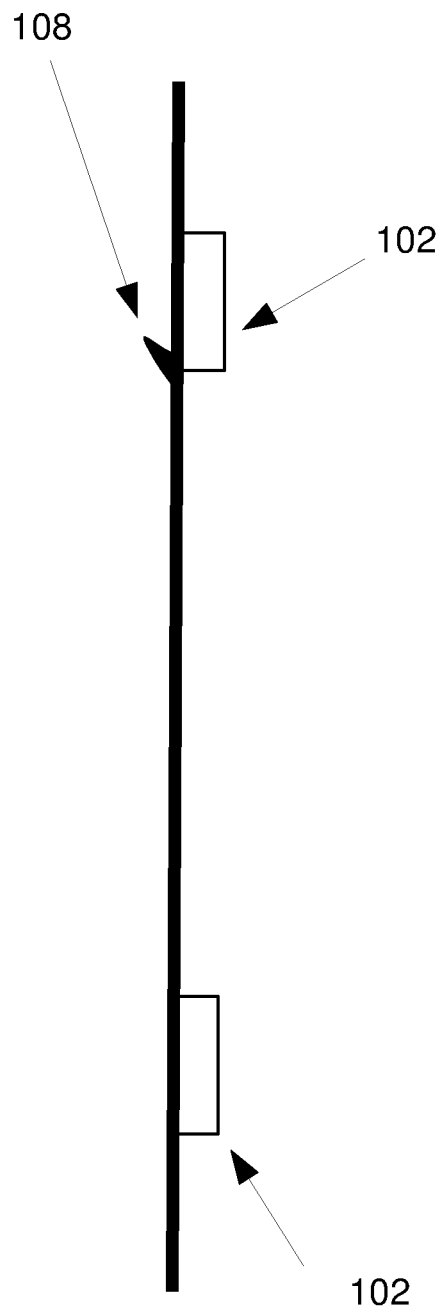
FIG. 3 is a diagram showing a side view of an outer half of an attachment device according to at least one embodiment herein.
Figure 4:
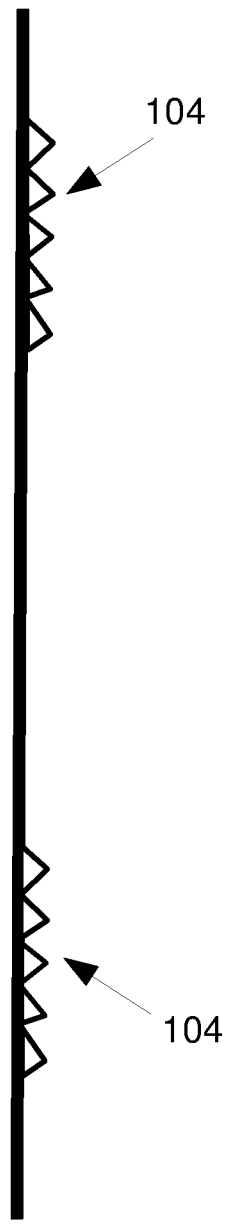
FIG. 4 is a diagram showing a side view of an inner half of an attachment device according to at least one embodiment herein.

Referring to FIGS. 1-5, a magnetic-actuated attachment device or clip 100 is provided, which includes at least two face-like square or round permanent magnetic halves 102 which are coupled with each other by means of a hinge or a joint 112. Referring to FIGS. 1-2, the device 100 is generally a slender structure having an inner face (as shown in FIG. 1) and an outer face (as shown in FIG. 2). In one embodiment, the device 100 is made from a first and second sheet of flexible sheet material with the magnets 102 sandwiched between the two sheets of material, as shown in FIGS. 3-5. Alternatively, each of the magnets may be covered with an individual sheet of material. The device 100 is preferably made from PVC or rubber material for protecting surfaces to which the device will be attached magnetically. Due to the magnetic attraction or adherence effect that the two magnet elements 102 have on one another, the device 100 may be used for clamping cloth, paper, or any material that may be inserted between these two magnet halves 102 and retained therebetween.

In one embodiment, the inner surface over each of the magnets 102 include a textured surface that increases the friction between the device and the item to be held between the magnets. In a preferred embodiment, the surfaces include a plurality of lateral grooves that mate or otherwise interlock with each other, as shown in FIG. 5. The groves may have a V cross sectional shape, as shown. In at least one embodiment, the outer surface includes a barb or step 108 extending therefrom. The bard 108 extends outward from the outer surface, as shown, to act as a stop to prevent the device 100 from slipping from the weight of the item inserted into the device. For example, the device 100 may be used to hold a shop towel on or against a welding table. The device 100 may be magnetically stuck to the table so that the barb 108 sits on the horizontal top of the table to prevent the device 100 from sliding off the vertical surfaces of the table. Finally, the device 100 may include tabs 110 to assist in pulling the magnets 102 apart. The device 100 preferably has an hourglass shape, which forms a hinge 112 between the two magnets 102. This shape also enables the device 100 to clamp materials having varying shapes.

In at least one embodiment, the device 100 includes two 5 mm thick permanent magnets, which are coupled with each other by means of a hinge 110 created with a first sheet of PVC or other rubberized material. The device 100 further includes a second sheet of PVC or other rubberized material that sandwiches the magnets 102 between it and the first sheet material. The magnets 102 may be Neodymium discs, as show in the figures, which provide magnetic-adhering faces on both sides thereof. The arrangement is such that, as shown in figures, when mounting the upper of front disc 1 onto the lower or rear disc 2, zones of opposite polarity are always facing each other, so that a relative powerful attraction force is possible between the two discs.

Figure 5A:
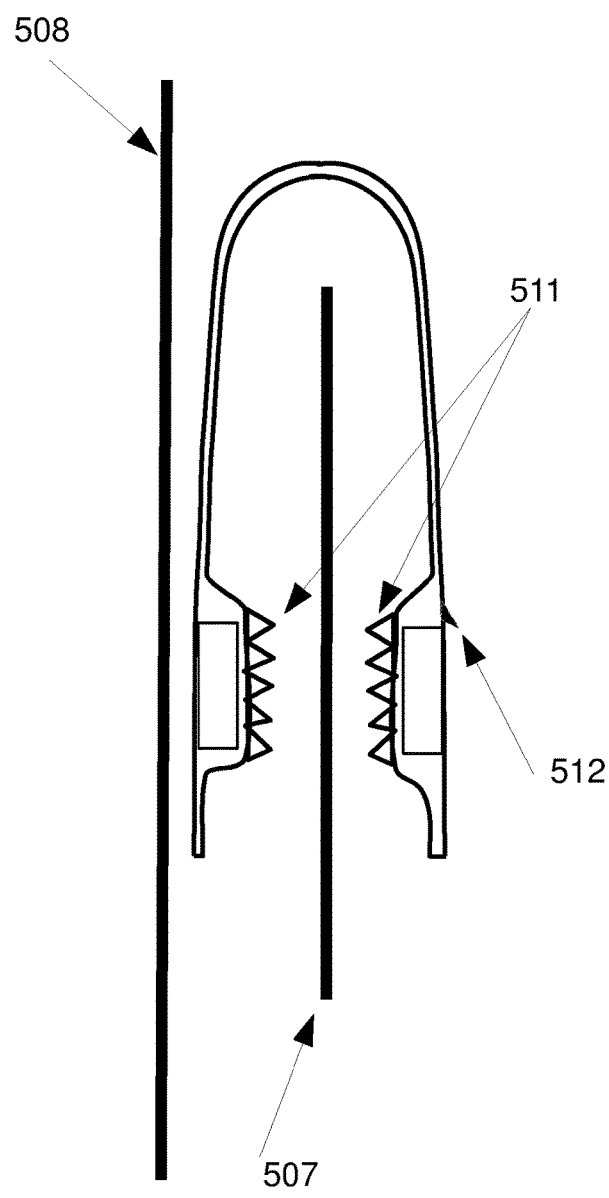
FIGS. 5A-5B show the attachment device in use.
Figure 5B:
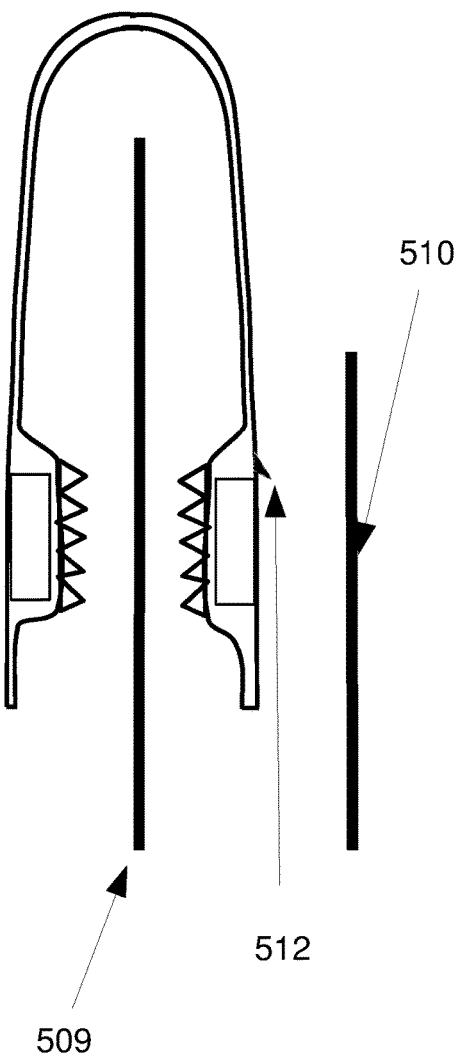

As shown in FIGS. 5A-5B, a material or article 7 may be inserted between the discs 1, for example, a towel, a magazine, or the like, and is maintained therebetween by means of the magnetic clipping action. Due to the "through" magnetization and the corresponding magnetic pole disposition, the total device 100 with the clipped material 507 may be mounted on any mild steel surface 508. It also can be used in to be attached to a pocket or belt 509 and a tool 510 and a material consisting of mild steel can be easily attached to the device 100.

As can be seen in FIGS. 5A-5B, the inner surfaces of the magnetic halves 102 may include textured surfaces 511 to increase the friction between the pair of magnetic halves. In at least one embodiment, at least one of the outer surfaces includes a protrusion 512 extending therefrom that creates a lip that catches on, for example, a tabletop. The protrusion 512 may limit the chance of the device 100 sliding down the metal surface. The protrusion 512 may be retractable into the rear face of the device may be used with all types of surfaces and extended out from the rear face when needed.

While the foregoing invention has been described in some detail for purposes of clarity and understanding, it will be appreciated by one skilled in the art, from a reading of the disclosure, that various changes in form and detail can be made without departing from the true scope of the invention.

What is claimed is:

1. A clamping device having opposing ends, the device comprising:

a first magnetic disc and a second magnetic disc, each of the discs located on a first sheet of flexible material a distance apart and covered by at least a second sheet of flexible material, wherein the clamping device has a longitudinal axis passing through a center of each of the first and second magnetic discs, the first sheet of flexible material forming a hinge between the first and the second magnetic discs, and an outer surface of the clamping device, wherein the hinge has an hourglass shape, at least a first and a second tab at a first opposing end of the device and at least a third tab at a second opposing end of the device, the at first and second taps extending outward from a perimeter of the first magnetic disc and the third tab extending from a perimeter of the second magnetic disc;

the at least a second sheet of flexible material forming an inner surface of the clamping device over each of the first and second magnetic discs, the inner surface over each of the first and second magnetic discs of the clamping device having a textured surface over each of the magnetic discs comprising a plurality of groves, wherein each of the first and second magnetic discs sits proud on the first sheet of flexible material and at least a portion of the at least a second sheet of flexible material with the textured surface thereon sits proud on the first and second magnetic discs and on the first sheet of flexible material, such that when the first and second magnetic discs are coupled with each other, a loop with a bulbous interior is formed that includes the hinge portion of the first sheet of flexible material.

2. The clamping device of claim 1, wherein at least one of the magnets comprises a countersunk hole therein.

3. The clamping device of claim 1, wherein the first and second magnets are fused between the first and the at least a second sheet of flexible material.

4. The clamping device of claim 1, wherein the textured surface over the first and second magnetic discs comprises a plurality of grooves lateral relative to the longitudinal axis and that interlock with each other, and wherein the lateral groves are parallel with each other.

5. The clamping device of claim 1, wherein the outer surface comprises a protrusion extending outward from the outer surface.

6. The clamping device of claim 5, wherein the protrusion comprises an elongated barb shaped structure extending laterally relative to the longitudinal axis.

7. The clamping device of claim 5, wherein the protrusion is retractable into the outer surface.

8. The clamping device of claim 1, wherein the discs have a circular shape.

9. The clamping device of claim 1, wherein the device is configured to support at least 20 kg force in a direction parallel to the inner surface of the device when in contact with a mild steel surface.

10. The clamping device of claim 1, wherein the discs have a circular shape and a diameter of at least 32 mm.

11. The clamping device of claim 1, wherein the device has a vertical dimension of about 4 inches and a lateral dimension of about 2 inches.

* * * * *